(12) United States Patent
Szczesuil et al.

(10) Patent No.: US 6,813,783 B2
(45) Date of Patent: Nov. 9, 2004

(54) METHOD AND APPARATUS FOR MAKING BODY HEATING AND COOLING GARMENTS

(75) Inventors: Stephen P. Szczesuil, Framingham, MA (US); Matt Correa, Hopedale, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/370,297

(22) Filed: Feb. 6, 2003

(65) Prior Publication Data

US 2003/0150049 A1 Aug. 14, 2003

Related U.S. Application Data

(62) Division of application No. 09/692,704, filed on Oct. 19, 2000, now Pat. No. 6,565,699.

(51) Int. Cl.[7] .............................................. A62D 5/00
(52) U.S. Cl. ........................................ 2/458; 156/290
(58) Field of Search .......................... 2/456, 458, 2.11, 2/413, 108, 69, 81, DIG. 1; 156/290–292, 177, 178, 179, 300; 165/46; 62/259.3, 457.9

(56) References Cited

U.S. PATENT DOCUMENTS

| | | | |
|---|---|---|---|
| 3,449,761 A | | 6/1969 | Long |
| 4,024,730 A | | 5/1977 | Bell et al. |
| 5,320,164 A | * | 6/1994 | Szczesuil et al. ............. 165/46 |
| 5,386,701 A | | 2/1995 | Cao |
| 5,538,583 A | | 7/1996 | Szczesuil et al. |
| 5,558,738 A | * | 9/1996 | Rector ........................ 156/169 |
| 6,565,699 B1 | * | 5/2003 | Szczesuil et al. ........... 156/290 |

* cited by examiner

*Primary Examiner*—Tejash Patel
(74) *Attorney, Agent, or Firm*—Vicent J. Ranucci

(57) ABSTRACT

A method and apparatus for making garments that can cool or heat the wearer of the garment. In one embodiment, the method comprises the steps of providing a pattern board having a channel configuration formed thereon that defines at least one channel circuit, disposing a first fusible fabric over the channel configuration of the pattern board, disposing a length of tubing over the channel configuration and depressing the tubing into the channels, disposing a second fabric over the tubing and first fusible fabric to form a first laminate assembly, and applying heat and pressure to the laminate assembly to form a laminate garment structure.

1 Claim, 8 Drawing Sheets

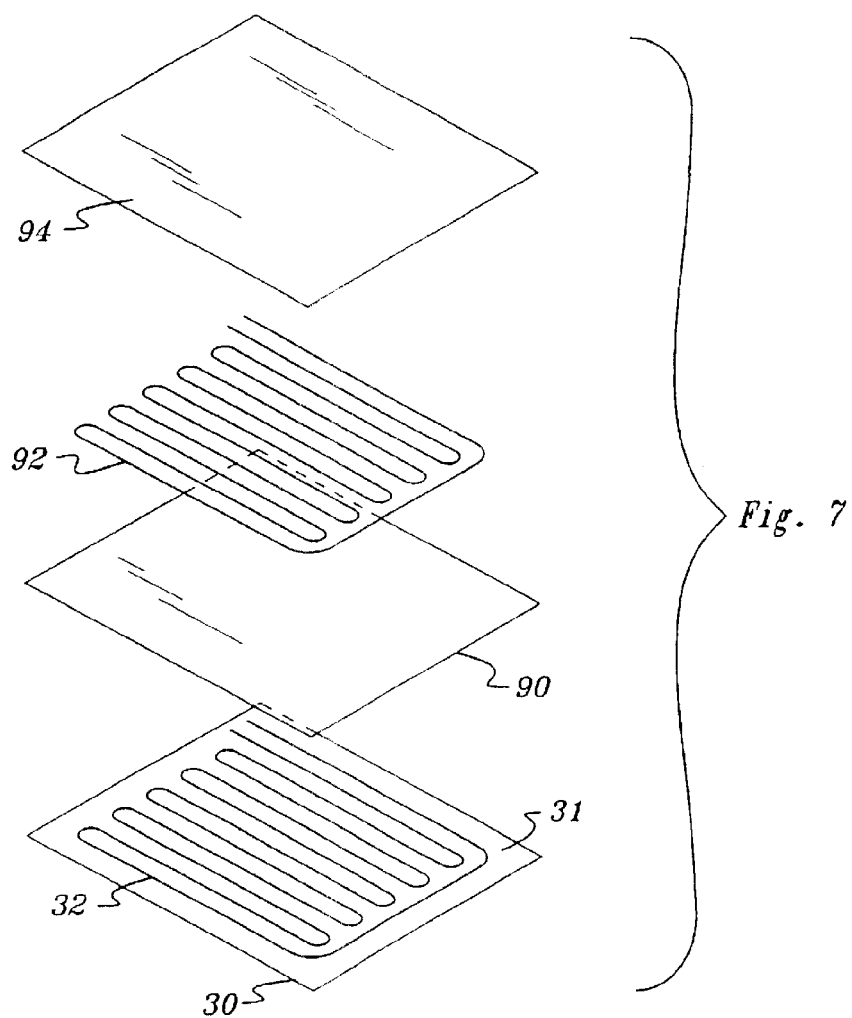
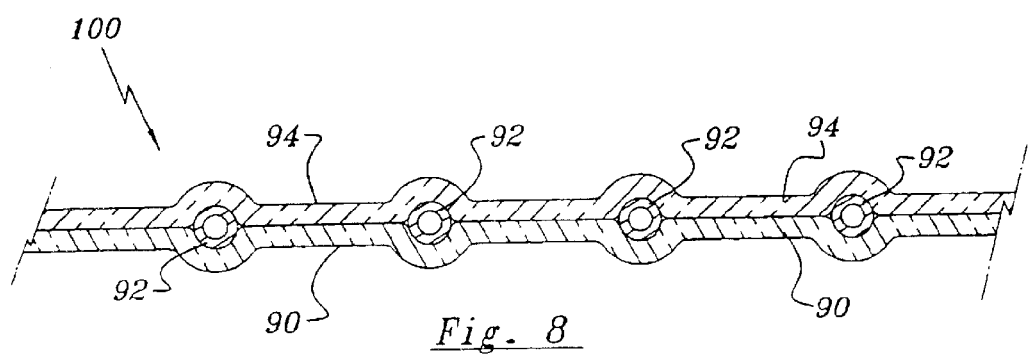

METHOD AND APPARATUS FOR MAKING BODY HEATING AND COOLING GARMENTS

This is a Division of application Ser. No. 09/692,704, filed Oct. 19, 2000, now U.S. Pat. No. 6,565,699.

BACKGROUND OF THE INVENTION

The invention described herein may be manufactured and used by the U.S. Government for Governmental purposes without the payment of any royalty thereon.

1. Field of the Invention

The present invention relates to a method for fabricating body heating and cooling garments.

2. Description of Prior Art

Military personnel, astronauts and other persons operating in extreme temperature environments typically require a heating or cooling garment. Typically, such garments are air and vapor permeable and comprise synthetic tubing that carries cooling or heating fluid medium. The tubing is in close body contact so as to effect transfer of the heat or cold to the wearer of the garment.

The heating or cooling garment can be configured into different shapes and sizes. For example, many heating or cooling garments are typically configured as vests. The garment utilizes tubing that is attached to a liner. Since pressures within the tubing can reach 100 p.s.i. (pounds/square inch), the mating of the tubing to its substrate must be fluid pressure-insensitive. The liner is then attached to a fabric which forms the outer portion of the garment. These garments are preferably stretchable and flexible to conform to the shape of the body of the individual. Furthermore, these garments provide mobility for arms and legs, and retain the tubing close to the body for more efficient transfer of heat or cold. The flexibility produces relatively less damage to the tubing during garment flexure and substantially reduces the likelihood of punctures or tears to the garment. Moreover, there is a requirement that these garments be relatively lightweight and easy to clean.

One conventional method for fabricating these garments involves sewing the tubing to a substrate or liner which is sufficiently porous to allow internal vapors to escape as well as to provide for air permeability. However, a significant problem with sewing the tubing is referred to as "needle holing". Needle holing requires that every inch of the tubing be sewn to the porous substrate. Such a technique significantly increases the risk of puncturing the tubing during the sewing process. Furthermore, the threads themselves provide a major irritant when the tubes are pressed into contact with the body. Additionally, the sewing method is slow and expensive. Automated sewing techniques are not viable options due to the difficulty of achieving registration of the tubing with predetermined patterns.

Another disadvantage of stitching or sewing arises when chemical protective clothing is being fabricated. In such a situation, stitching the tubing to any substrate results in needle holes that permit unwanted chemicals to move from one side of the garment to the other. One conventional technique used in an attempt to eliminate this problem with sewing or stitching is to fabricate the heating/cooling garments with a bladder sealed at its edges wherein the cooling fluid is contained within the bladder. However, while bladder-type garments do in fact conduct heat away from the body or conduct heat to the body, the resulting garment is non-breathable, non-stretchable and non-flexible due to the two-coated fabrics which are joined together by heat. Furthermore, flexibility of the garment is impeded when a relatively large volume of liquid is captured in the garment. Additionally, only conduction can be used to remove heat since a bladder-type garment poses an impermeable barrier against natural perspiration. Therefore, the bladder-type cooling garment completely eliminates the possibility of evaporative or convective cooling. A further disadvantage of the bladder-type garments is that the edges of the bladder deteriorate when subjected to pressures higher than 30 psi.

There are other conventional methods for attach tubing to a liner or substrate. One such method involves brushing or rolling adhesives onto liners to adhere the tubing to liners. However, all lining porosity is destroyed when the adhesive is massively applied across the substrate.

Another conventional technique is to use adhesive tape to secure the tubing to the liner. Specifically, the adhesive tape contacts the liner to either side of the tube along its length. This technique is exceedingly difficult to implement due to the fact that when the tubing is formed around small radius corners, the overlying strip of tape has to be notched in order to follow the tubing around the corners. Furthermore, tape impedes the ability of the garment to stretch and also degrades garment permeability. Additionally, tape does not always sufficiently adhere the tubing to the liner.

What is needed is a new and improved method for making such a heating and cooling garment that solves the problems mentioned in the foregoing discussion that are associated with conventional methods and also provides all the desirable characteristics such as flexibility and permeability. Furthermore, such a new and improved method should result in a relatively lower per-unit manufacturing cost of the garment.

SUMMARY OF THE INVENTION

In one aspect, the present invention is directed to a method for making garments that can cool or heat the wearer of the garment. In one embodiment, the method comprises the steps of the method comprising the steps of providing a pattern board having a channel configuration formed thereon that defines at least on channel circuit, disposing a first fusible fabric over the channel configuration of the pattern board, disposing a length of tubing over the channel configuration and depressing the tubing into the channels, disposing a second fabric over the tubing and first fusible fabric to form a first laminate assembly, and applying heat and pressure to the laminate assembly to form a laminate garment structure.

In a related aspect, the present invention is directed to a method for making a garment that can cool or heat a wearer of the garment, the method comprising steps of providing a pattern board having first side, a second side and a channel configuration having channels that define at least one circuit, providing a length of tubing having an exterior surface, applying a heat-activated adhesive upon the exterior surface of the tubing, depressing the tubing into the channels, placing a first fabric layer upon the tubing, ironing the first fabric to activate the adhesive so as to adhere the tubing to the first fabric, lifting the first fabric with the tubing adhered thereto from the pattern board, placing the first fabric with the tubing adhere thereto on a substantially flat surface with the tubing side facing up, applying a second adhesive to the tubing and first fabric layer, applying a second fabric over the tubing and first fabric layer such that the second fabric contacts the adhesive wherein the fabrics and the tubing forming a laminate assembly, applying heat and pressure to the laminate assembly so as to activate the second adhesive thereby forming a laminate garment structure.

In yet a further aspect, the present invention is directed to a method for making a garment for heating and cooling the wearer of the garment, the method comprising the steps of providing a pattern board comprising a first side having a channel configuration formed therein that defines at least one channel circuit and a plurality of substantially flat portions adjacent the channel configuration. The pattern board further comprises a second side opposite the first side. The method further comprises the steps of disposing a first layer of flexible material over first side of the pattern board, disposing an adhesive film over the first layer of flexible material, disposing a second layer of flexible material over the adhesive film wherein the layers of flexible material and adhesive film form a laminate assembly, and applying heat and pressure to the laminate assembly so as to activate the adhesive film and fuse together the portions of the layers of flexible material that correspond to the substantially flat portions of the first side of the pattern board.

In another aspect, the present invention is directed to a pattern board comprising a first side that defines a channel configuration having channels that define at least one circuit wherein each channel has a bottom surface, a second side opposite the first side, and at least one turn-about member attached to the bottom surface of each channel.

BRIEF DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

FIG. 7 is an exploded view of a laminate assembly produced by intermediate steps of one embodiment of the method of the present invention.

FIG. 8 is a cross-sectional view of a laminate garment structure produced by one embodiment of the method of the present invention.

DETAILED DESCRIPTION

Figure 1:
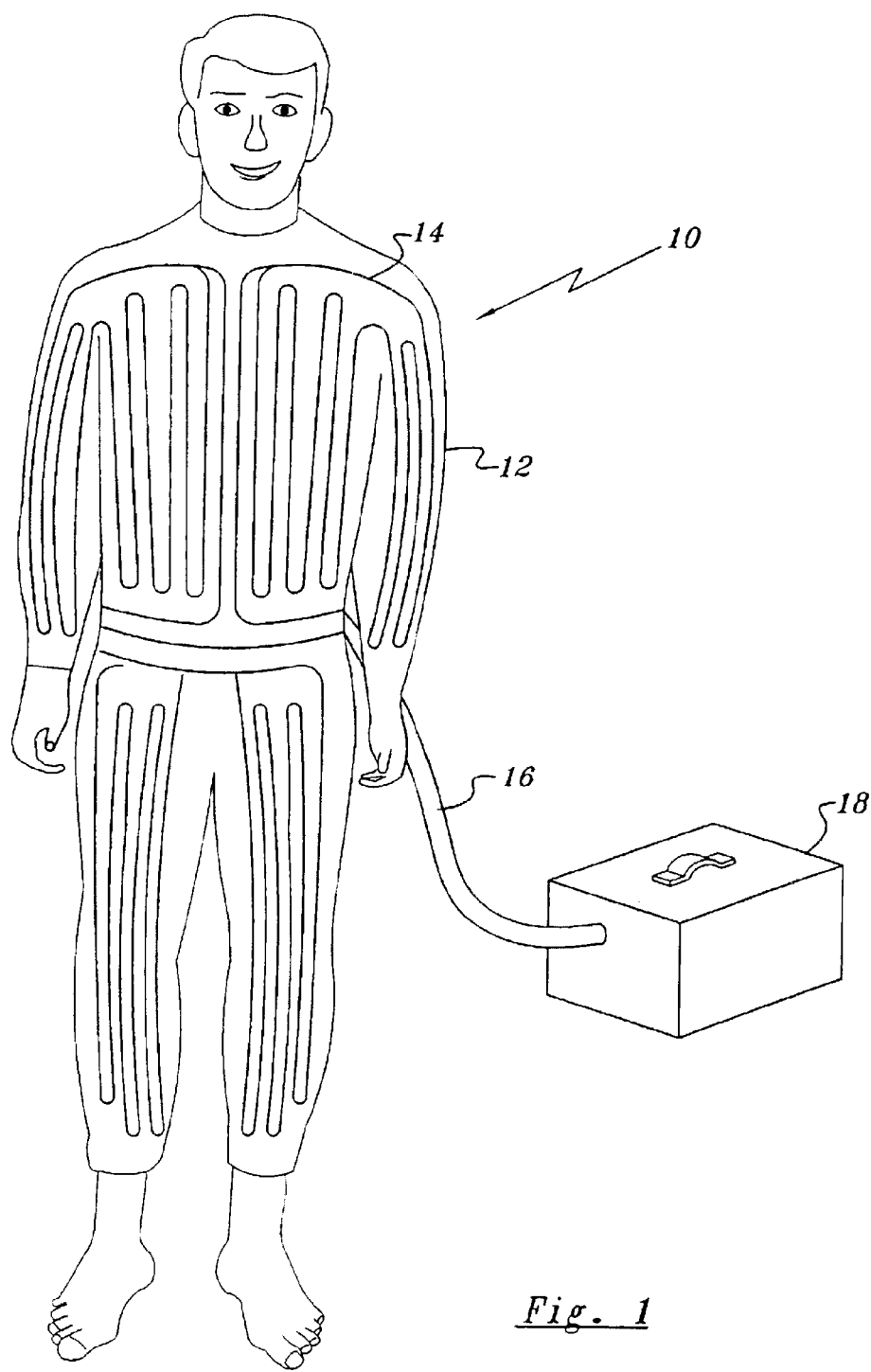
FIG. 1 is a diagrammatic representation of a heating or cooling suit or garment having tubes through which a heating or cooling medium is pumped.

Referring to FIG. 1, wearer 10 is wearing heating/cooling garment or suit 12 of the present invention. Garment 12 includes heating or cooling tubing 14 dispersed throughout garment 12. Tubing 14 is supplied with heating or cooling fluids via an umbilical connection line 16 which is connected to a heating/cooling unit 18. Garment 12 is extremely flexible, durable, and both air and vapor permeable so as to permit cooling via not only the conduction of the tubing adjacent to the wearer's, but also by the escape of vapor from the body to ambient (i.e. cooling via convection).

Figure 2:
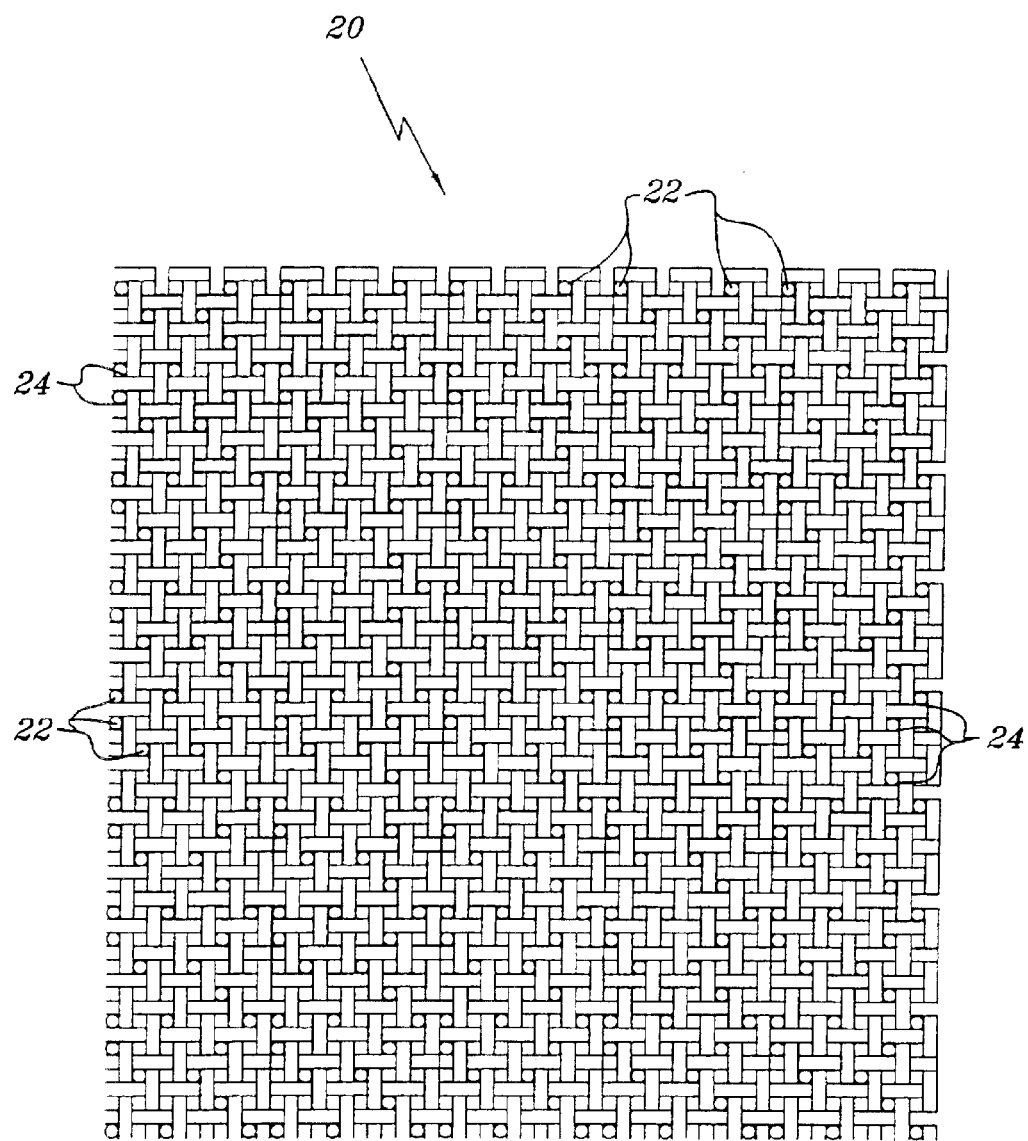
FIG. 2 is a top view of fusible fabric used by the method of the present invention.

Referring to FIG. 2, garment 12 further comprises fusible fabric 20 in an open weave or open lattice structure which provides the required air and vapor permeability. Such a fusible fabric is described in commonly owned U.S. Pat. No. 5,320,164, the disclosure of which is incorporated herein by reference. Fabric 20 includes a number of patterned dots 22 that adhere to the intersections between the woven strands 24. Such a configuration is also described in the aforementioned U.S. Pat. No. 5,320,164. In another embodiment, fabric 20 is not woven. In one embodiment, fabric 20 is fabricated from high pile fleece.

Figure 3:
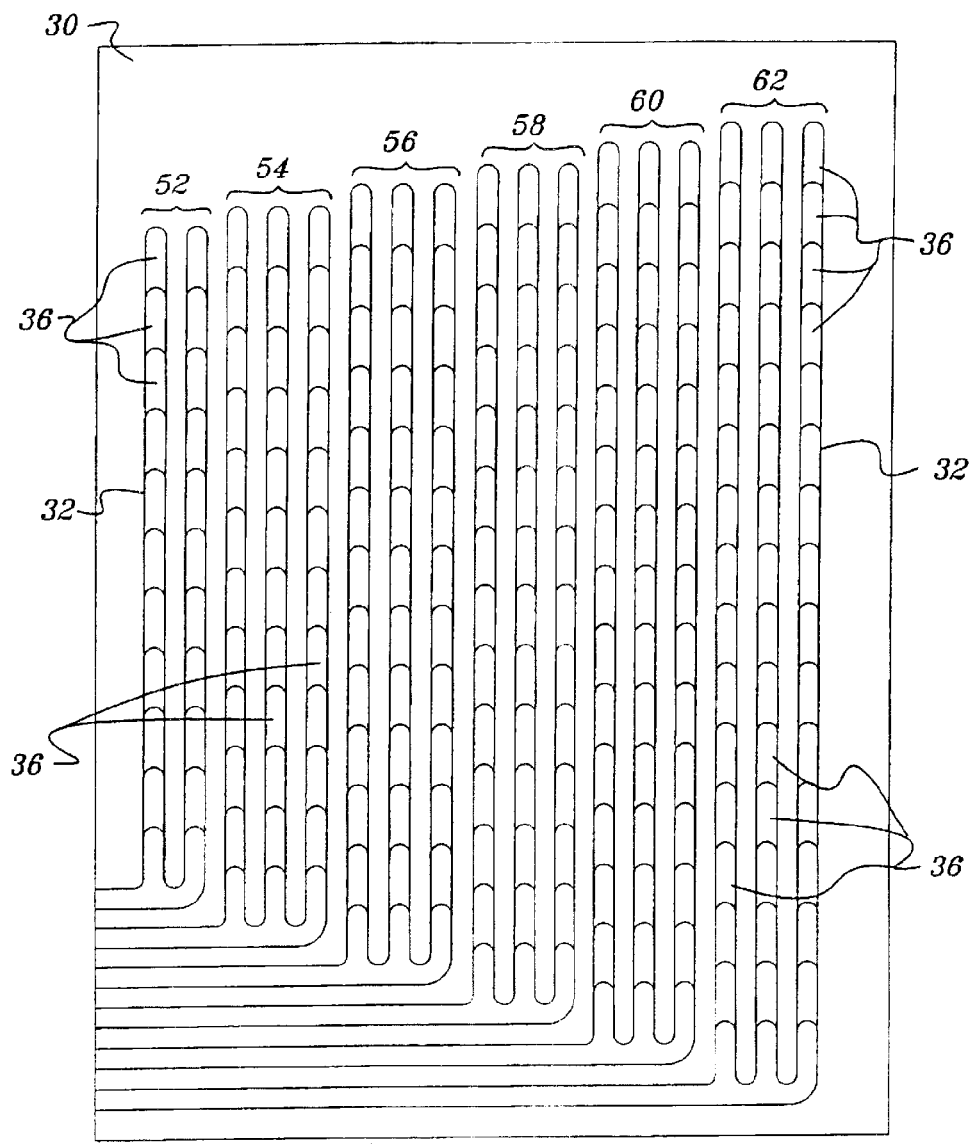
FIG. 3 is a top plan view of a pattern board of the present invention.
Figure 4:
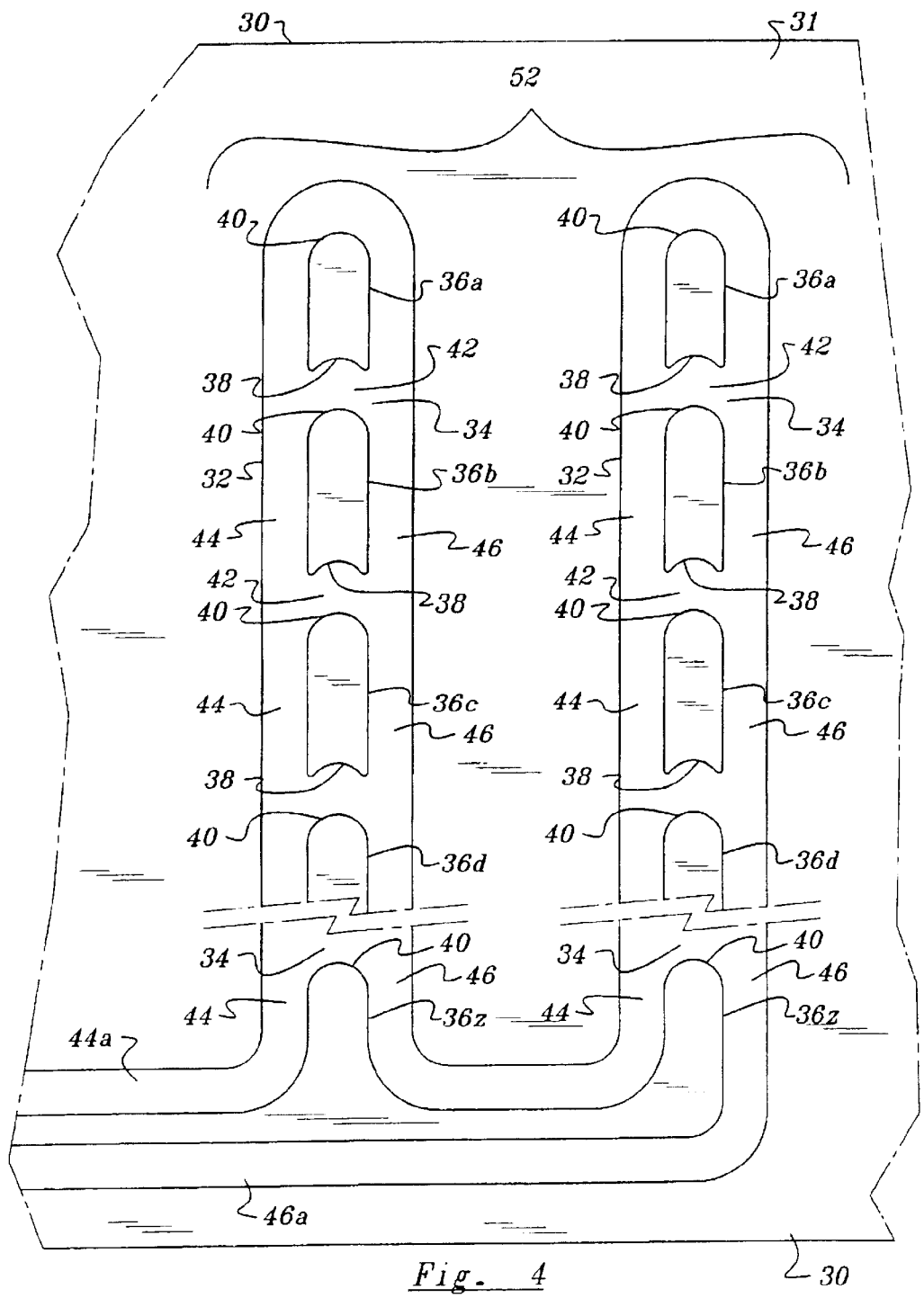
FIG. 4 is a top plan view of an enlarged portion of the pattern board shown in FIG. 3.

Referring to FIGS. 3 and 4, there is shown pattern board 30 in accordance with the present invention. Pattern board 30 has top surface 31 and an opposite side (not shown). Pattern board 30 can be fabricated from a variety of materials. In one embodiment, pattern board 30 is fabricated from a phenolic heat-resistant plastic. Other suitable materials can be used. Pattern board 30 comprises a plurality of channels 32. Each channel 32 has a bottom surface 34 and a plurality of turn-about members 36a–z that extend upward from bottom surface 34. It is to be understood that channels 32 can have more or less than the actual number of turn-about members 36a–z shown. Each member 36a–z has a pair of curved ends 38 and 40. Curved channels 42 are formed between each member 36. Channel 32 comprises channel portion 44 that extends on one side of each member 36a–z. Channel 32 further comprises channel portion 46 that extends on the other side of the each member 36a–e. Channel 44 includes portion 44a and through which tubing (not shown) can enter or exit pattern board 30. Similarly, channel 46 includes portion 46a through which tubing (not shown) can enter or exit pattern board 30. Referring to FIG. 4, channels 42, 44 and 46 are all sized for receiving tubing (not shown) used to fabricate a heating or cooling garment. It is to be understood that each channel 32 can be configured to provide channels 42, 44 and 46 of varying sizes in order to accommodate tubing of various diameters.

Figure 5:
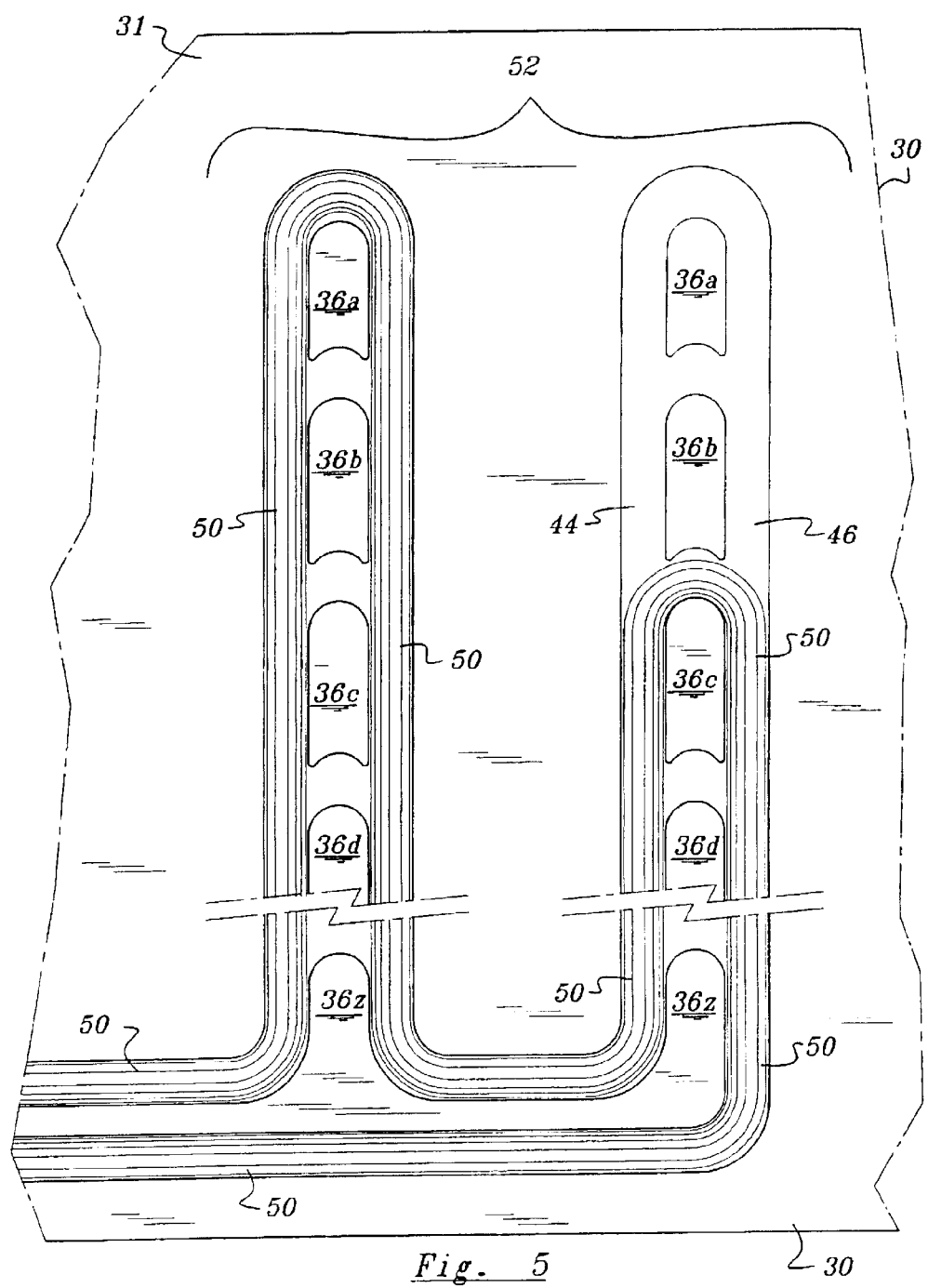
FIG. 5 is the top plan view of FIG. 4 showing the placement of tubing with channels of the pattern board.

Referring to FIG. 5, turn-about members 36 allow serpentine tubing configurations of different sizes to be fabricated. The size of the tubing configuration depends upon the size of the garment. Tubing 50 can be wrapped around turn-about member 36c of each channel 32 for a relatively small garment, or around turn-about member 36a for a relatively large garment. In one embodiment, tubing 50 is perforated to form an air vest.

Referring to FIG. 3, the channel portions 44 and 46 that share the same piece of tubing 50 comprise a channel circuit. Thus, referring to FIG. 3, pattern board 30 comprises six channel circuits 52, 54, 56, 58, 60, and 62. Although FIG. 3, shows just six circuits, it is to be understood that pattern board 30 can be configured to have less than six circuits or more than six circuits. As shown in FIG. 3, pattern board 30 is configured to have a generic serpentine channel design that can be used to make garments of varying sizes. It is to be understood that the channel configuration of pattern board 30 is just one example and that other configurations can be used. Furthermore, the channel configuration can be modified to provide channel portions 44a and 46a.

Figure 6:
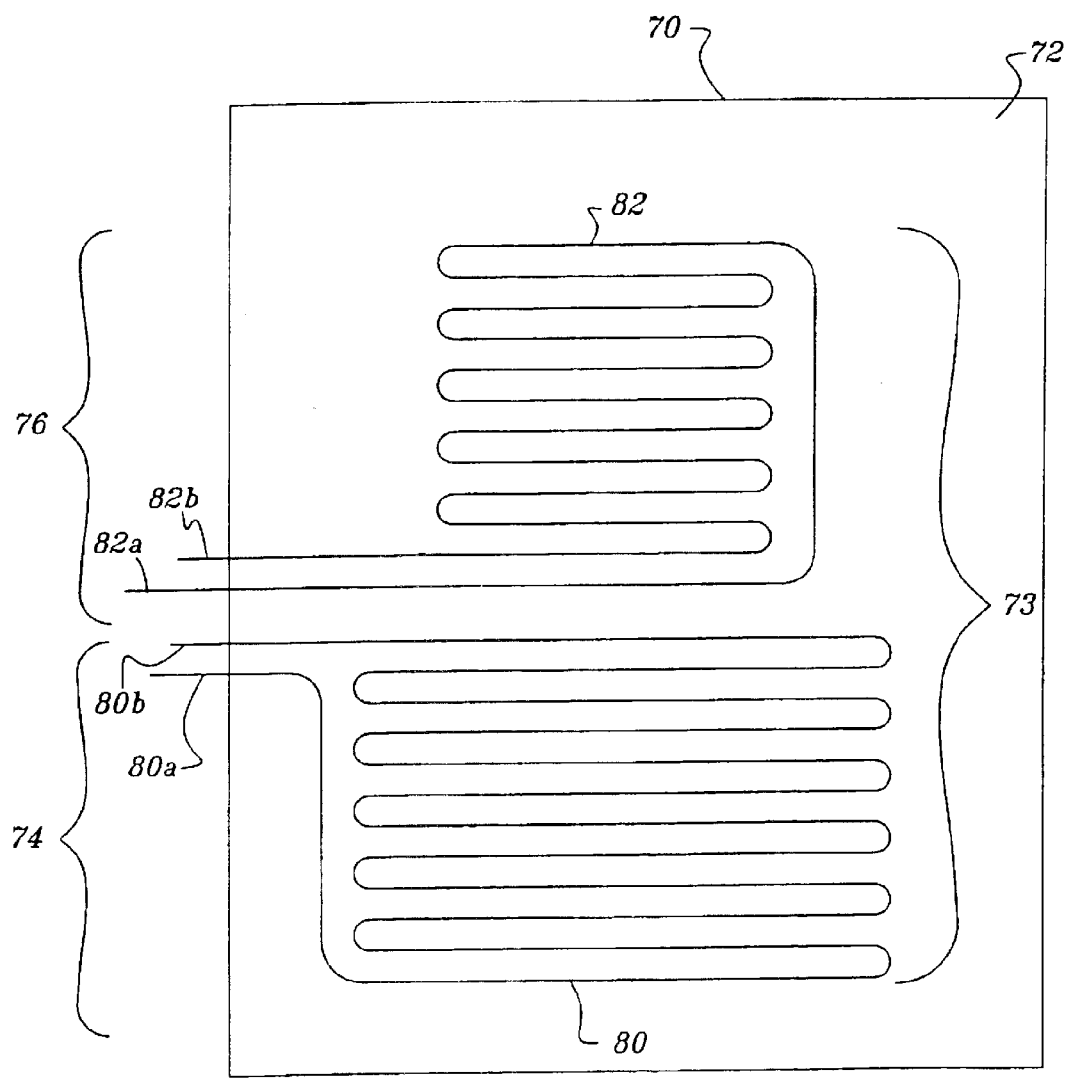
FIG. 6 is a top plan view of an alternate embodiment of the pattern board of the present invention.

Referring to FIG. 6, there is shown an alternate pattern board 70 in accordance with the present invention. Pattern board 70 generally comprises a substantially flat surface 72 and a specific serpentine channel configuration 73 that has lower portion 74 and upper portion 76. Pattern board 70 is suitable for fabricating a heating/cooling vest. Upper portion 76 defines one circuit and corresponds to the upper portion of the vest that covers the upper torso, chest and lower shoulder area of a wearer. Lower portion 74 defines another circuit and corresponds to the lower portion of the vest that covers the abdomen, lower torso portion, and the hip area of the wearer. Upper portion 76 comprises channel 82. Channel 82 is sized for receiving a specific size tubing (not shown). Channel 82 has portions 82a and 82b through which the tubing (not shown) can enter or exit pattern board 70. Similarly, lower portion 74 comprises channel 80. Channel 80 is sized to receive a specific size tubing (not shown). Channel 80 has portions 80a and 80b through which the tubing (not shown) enters and exits pattern board 70. Portions 80a, 80b, 82a and 82b allows the tubing to be connected to sources of heating or cooling medium. Pattern board 70 does not utilize turn-about members such as members 36 described in the foregoing description. It is to be understood that the serpentine channel configuration is just one example and that other configurations can be used. Furthermore, the serpentine channel configuration can be modified to provide portions 80a, 80b, 82a and 82b at different locations.

The particular channel pattern in pattern boards 30 and 70 depends upon the type of heating/cooling garment that is to be manufactured, e.g. vest, suit, etc.

Each step of one embodiment of the method of the present invention is described in the ensuing description wherein reference is made to FIGS. 2, 3, 4 and 7.

a) The first step is to provide a pattern board that has the desired channel configuration. For purposes of describing the steps of the method of the present invention, reference will be made to pattern board 30 shown in FIGS. 3, 4 and 7.

b) The next step entails selecting the number of circuits of pattern board 30 that are to be utilized for making the desired garment.

c) Next, a first layer of fabric 90 is disposed over the pattern board 30 specifically covering the selected circuits. In one embodiment, fabric 90 is configured in the same manner fusible fabric 20 described in the foregoing description and shown in FIG. 2.

d) Next, tubing 92 having the appropriate diameter is disposed over fabric 90 and depressed into channel portions 44 and 46 (see FIG. 5) such that portions of fabric 90 are also disposed with channel portions 44 and 46 and are intermediate tubing 92 and pattern board 30. Tubing 92 is simply fitted into channel portions 44 and 46 without applying adhesives.

e) The next step of the method of the present invention comprises disposing second fabric 94 over tubing 92 to form a laminate assembly. Fabric 94 can be either fusible or non-fusible.

f) Next, laminate assembly is inserted into a press wherein heat and pressure are applied to the laminate assembly in order to melt the adhesive dots of fabric 90 so as to fuse fabric 90 to tubing 92 and to portions of fabric 94 that surround tubing 92 to form a laminate garment structure 100 shown in FIG. 8. The application of heat and pressure with a press is described in the aforementioned U.S. Pat. No. 5,320,164.

g) Next, the laminate garment structure 100 is removed from the press and allowed to cure (i.e. cool).

h) Next, any excess fabric is removed from laminated garment structure 100 so as to enable the garment to take its desired shape, e.g. vest, suit, etc. Fabrics 90 and 100 determine the air/vapor porosity of the resulting garment.

In an alternate embodiment, fabric 94 is first disposed over pattern board 30. Tubing 92 is then disposed over fabric 94 and depressed within the channel portions (i.e. portions 44 and 46) of the selected circuits. Next, fusible fabric 90 is then disposed over the top of tubing 92. The resulting laminate assembly is then placed in the press for the application of heat and pressure as described above.

In a further embodiment, fabric 90 does not contain any adhesive dots. Instead, a first layer of adhesive film is disposed over fabric 90. Next, tubing 92 is disposed over the adhesive film and is depressed into the channel portions (i.e. portions 44 and 46 of channel 32) of the selected circuits. A second adhesive film is then disposed over tubing 92. Fabric 94 is then disposed over the second adhesive film. The resulting laminate assembly is then placed in the press for the application of heat and pressure as described above.

In yet a further embodiment, a chemical protective-type fabric (not shown) is first disposed over pattern board 30. Tubing 92 is then disposed over the chemical protective-type fabric and depressed within the selected channel portions (i.e. channel portions 44 and 46). Next, fusible fabric 20 is then disposed over the top of tubing 92. The resulting laminate assembly is then placed in a press for the application of heat and pressure as described in the foregoing description. In one embodiment, the chemical protective-type layer is SYMPATEX™.

In another embodiment, the method of the present invention comprises the following steps:

a) applying a heat-activated adhesive upon the exterior surface of the tubing;

b) placing tubing 92 into the selected channel portions (i.e. portions 44 and 46) of pattern board 30;

c) placing a first fabric layer upon tubing 92 and removing any wrinkles in the first fabric;

d) ironing the first fabric to activate the adhesive and form a bi-component laminate assembly;

e) lifting the bi-component laminate assembly from the pattern board and place the bi-component laminate assembly on a flat surface with the tubing side facing up;

f) applying a second adhesive to tubing 92 and the first fabric layer;

g) applying a second fabric over the tubing and first fabric layer such that the second fabric contacts the adhesive to form a tri-component structure;

h) placing the tri-component structure in a press and applying heat and pressure to the tri-component structure so as to activate the second adhesive; and i) removing the tri-component structure from the press and allowing the tri-component structure to cure.

In a preferred embodiment, the ironing step is accomplished with a conventional consumer-type iron. In a preferred embodiment, the steam setting of the iron is not utilized. In one embodiment, the second adhesive is a moisture-cure type adhesive that is sprayed on the tubing and first fabric. In a preferred embodiment, the second adhesive is of the type that does not penetrate through the surface of the first and second fabrics. In a preferred embodiment, the second adhesive dries without stickiness. In one embodiment, the application of heat and pressure is accomplished via a press as described in the foregoing description.

Figure 9:
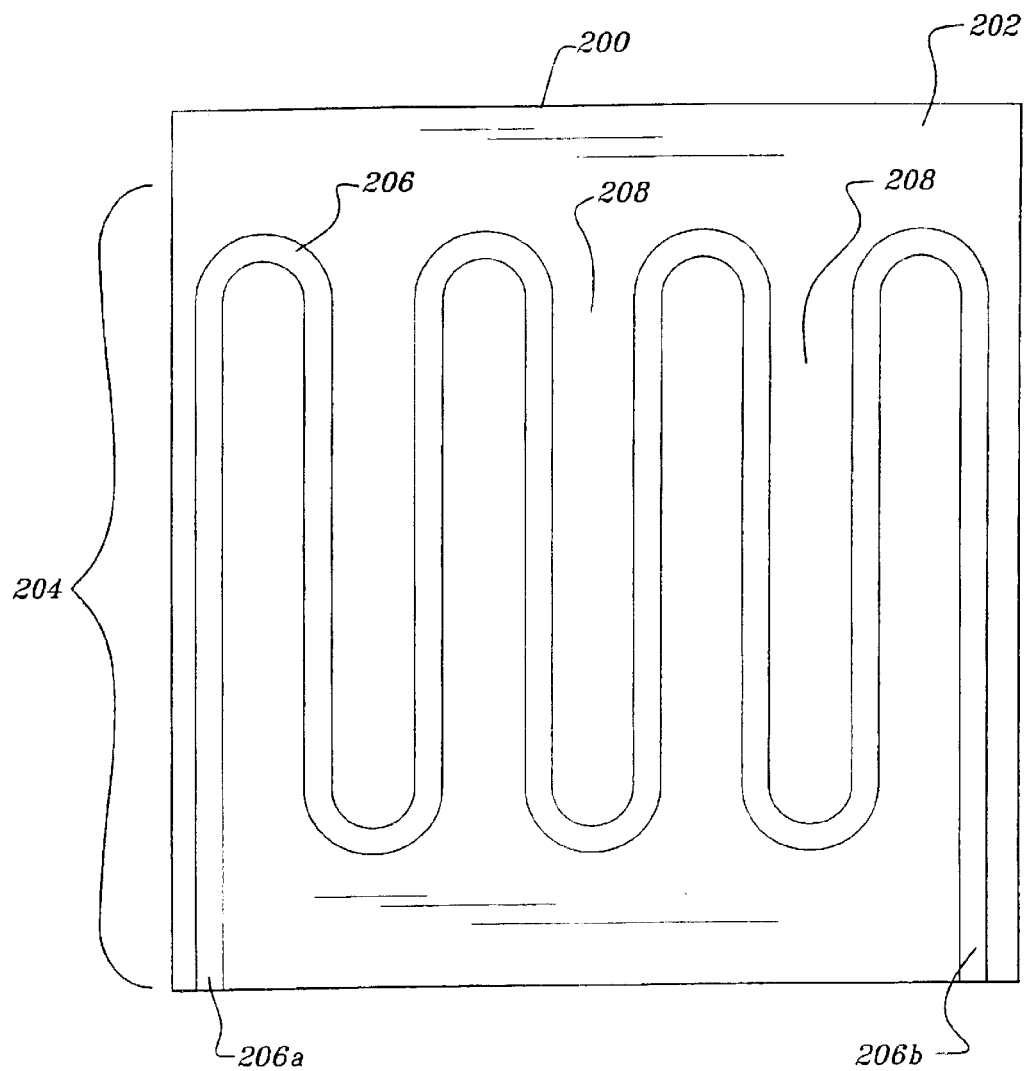
FIG. 9 is top plan view of a further embodiment of the pattern board of the present invention

In another embodiment, the method of the present invention is directed to making a garment for heating or cooling a wearer wherein the garment contains no tubing but does contain a plurality of interior channels therein for receiving heating or cooling medium or wires, e.g. fiber optic cables. Such an embodiment comprises the following steps:

a) providing pattern board 200 having a first side 202, a second side (not shown) and channel configuration 204 formed in the first side 202 that defines a circuit. As shown in FIG. 9, channel configuration 204 comprises serpentine channel 206. Channel 206 includes portions 206a and 206b that provide for the formation of inlet or outlets in the finished garment to allow the introduction of heating or fluid medium, wires, fiber optic cable, etc. The portions of first side 202 that are not part of channel 206 are indicated by numeral 208 and, in one embodiment, are substantially flat b) disposing a first layer of flexible material over first side of the pattern board;

c) disposing an adhesive film over the first layer of flexible material;

d) disposing a second layer of flexible material over the adhesive film wherein the layers of flexible material and adhesive film form a laminate assembly;

e) applying heat and pressure to the laminate assembly so as to activate the adhesive film and fuse together the portions of the layers of flexible material that correspond to portions 208 of the pattern board thereby forming a laminate garment structure having interior fluid-tight and vapor-tight channels between the layers of flexible material; and f) curing the laminate garment structure.

In one embodiment, each of the layers of flexible material comprises coated aluminum foil. In another embodiment, each of the layers of flexible material is a film-based fusible material. In a further embodiment, each of the layers of flexible material is a textile-based fabric. In one embodiment, the application of heat and pressure is accomplished by using a press as described in the ensuing description.

Once the basic laminate garment structure is fabricated by any of the methods described above, excess fabric is trimmed away. Once a pair of laminate garment structures are fabricated, the garment structures and be secured together to form the front and a garment, i.e. vest, with a front side and a back side of the garment. In one embodiment, shoulder straps are used to attach the upper portions of the garment structures together, and additional straps are used to attach the side portions of the garment structures together. However, any one of a variety methods for attaching the garment structures together can be used, e.g. snaps, hooks and fasteners, hook and loops, Velcro™, etc. thereby allowing one size of the complete garment to fit wearers of many sizes. In a preferred embodiment, the garment structures are attached together so as to provide a close fit with the body of the wearer in order to maximize the heating or cooling effect. In one embodiment, side pockets are included on the complete garment. In such an embodiment, the side pocket is configured as a stretch pocket of lycra fabric with a zipper closure. In one embodiment, the side pocket contains the tubing that feeds heating or cooling medium to the tubing interior of the garment or receives heating or cooling medium from the tubing interior of the garment.

As described in the foregoing description, the tubing serves as a conduit for a heating or cooling medium. A typical heating medium can be hot or warm water, or heated gas (i.e. neon, fluorescent, etc.). A typical cooling medium can be cool or cold water, or cold gases such as freon or other refrigerants. Such heating or cooling mediums can be applied via pumps or vacuum sources, or any other devices that create pressure. The tubing can also be used as a conduit for receiving wires or fiber optic cables.

The adhesives described above are chosen from group comprising polyamids, polyesters, polyethylenes, polyvinyl chlorides, polyvinyl acetates and polyvinyl acetate copolymers.

Thus, the present invention obviates many of the problems of the prior art and provides a stretchable, flexible, air permeable, vapor permeable, and durable heating and cooling garment with a relatively lower weight and per-unit manufacturing cost. Furthermore, the resulting heating and cooling garment can be laundered and dry-cleaned.

The heating and cooling garment made in accordance with the present invention also has many applications, including, but not limited, to garments for protection against chemical or biological agents and extreme temperature conditions. Thus, such garments can be used for military, sports and industrial purposes. Furthermore, the laminated garment structures as described in the foregoing description can be used in other articles of manufacture as well, such as sleeping bags, tents, blankets, etc. Additionally, the laminated garment structures as described in the foregoing description can be used for entirely different purposes such as melting snow or ice from a surface, e.g. sidewalk, driveway, etc., or keeping items warm or hot, e.g. food, drinks, etc.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, having described the invention, what is claimed is:

1. A garment, for heating and cooling the wearer of the garment, made according to the method comprising the steps of:

a) providing a pattern board comprising a first side that includes a channel configuration formed therein that defines at least one channel circuit and plurality of substantially flat portions adjacent the channel configuration, and a second side opposite the first side;

b) disposing a first layer of flexible material over first side of the pattern board;

c) disposing an adhesive film over the first layer of flexible material;

d) disposing a second layer of flexible material over the adhesive film wherein the layers of flexible material and adhesive film form a laminate assembly, and wherein the layers of flexible material being selected from the group comprising aluminum foil, film-based fusible material, and textile-based fabric; and e) applying heat and pressure to the laminate assembly so as to activate the adhesive film and fuse together the portions of the layers of flexible material that correspond to the substantially flat portions of the first side of the pattern board, said portions of layers being fused for forming interior fluid-tight and vapor-tight channels between the layers of flexible material, and said channels being for receiving heating or cooling medium, said medium being selected from the group comprising wires and fiber optic cables.

* * * * *